(12) United States Patent
VenHuizen

(10) Patent No.: US 7,228,807 B1
(45) Date of Patent: Jun. 12, 2007

(54) DEVICE FOR IMPROVING THE SPACING BETWEEN SEEDS PLANTED BY A JOHN DEERE VACUUM PLANTER

(76) Inventor: Dale VenHuizen, 1954 IL Route 78N, Stockton, IL (US) 61085

( * ) Notice: Subject to any disclaimer, the term of this patent is extended or adjusted under 35 U.S.C. 154(b) by 0 days.

(21) Appl. No.: 11/392,055

(22) Filed: Mar. 29, 2006

(51) Int. Cl.
*A01C 7/00* (2006.01)
*A01C 9/00* (2006.01)

(52) U.S. Cl. .................... 111/174; 111/185
(58) Field of Classification Search ......... 111/170–189
See application file for complete search history.

(56) References Cited

U.S. PATENT DOCUMENTS

| | | | | |
|---|---|---|---|---|
| 3,880,099 A | * | 4/1975 | Houston et al. | 111/200 |
| 3,905,313 A | * | 9/1975 | Grether | 111/200 |
| 4,034,784 A | * | 7/1977 | Ball et al. | 141/348 |
| 4,971,255 A | * | 11/1990 | Conrad | 239/650 |
| 5,984,635 A | * | 11/1999 | Keller | 416/20 A |
| 6,651,570 B1 | * | 11/2003 | Thiemke | 111/184 |

* cited by examiner

*Primary Examiner*—Christopher J. Novosad
(74) *Attorney, Agent, or Firm*—Robert L. Marsh

(57) ABSTRACT

A seed planter of the type having a metering unit with a seed chute that drops seeds into a seed tube for planting as manufactured by John Deere is provided with a deflector in the metering unit. The deflector directs the path of the seeds as they fall away from the seed disk so as to free fall along a vertical centerline between the leading and trailing walls of the seed tube and between the opposing sides thereof.

13 Claims, 8 Drawing Sheets

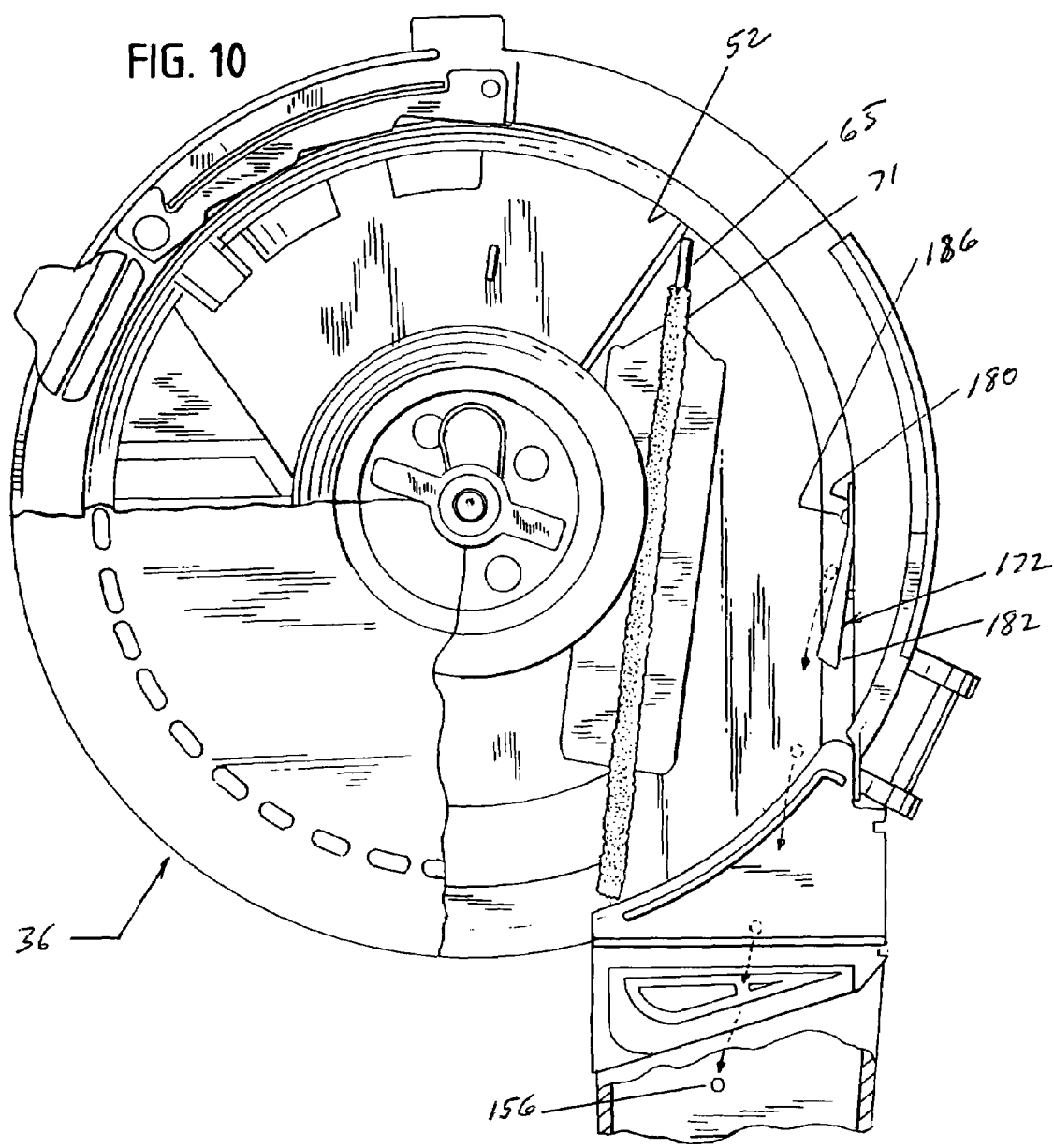
FIG. 10
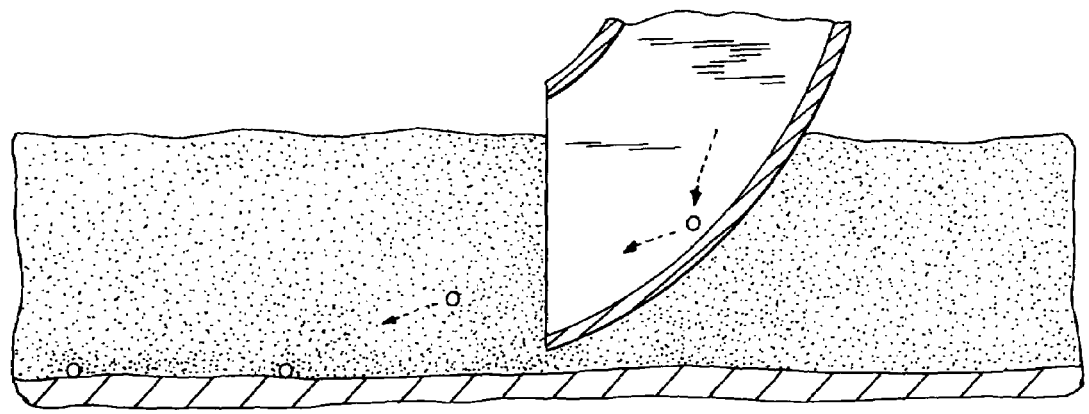

DEVICE FOR IMPROVING THE SPACING BETWEEN SEEDS PLANTED BY A JOHN DEERE VACUUM PLANTER

The present invention relates to seed planters of the type manufactured by John Deere which receive a rotatable seed disk and, in particular, to a method and apparatus for retaining equal spacing between seeds that are planted by such machines.

BACKGROUND OF THE INVENTION

John Deere manufactures a Max Emerge Drawn Conservation Flex-fold planter. The heart of the John Deere planter is a metering unit which retains a circular rotatable seed disk that separates the interior of the metering unit into two chambers, one on each side of the disk. The seed disks employed in the machine have a plurality of holes, with the centers thereof spaced to define a circle having a radius a little less than the radius of the disk. A vacuum is drawn in the chamber formed on one side of the disk and seeds are introduced into the chamber on the opposite side of the disk. The diameter of the holes in the seed disks are sized such that, when operating properly, the vacuum will draw one seed against the aperture of each hole in the disk and retain the seed as the disk rotates to a position above a seed tube, at which point the disk moves away from the vacuum chamber and the seed falls away from the disk and into the seed tube to be planted.

The planter is intended for use with many types of seed, including sunflower, cotton, soybean, sorghum, sugar beets, popcorn, sweet corn, and corn seed (feed corn seed). Each type of seed has a different size and configuration and the planter is, therefore, provided with a plurality of seed disks, which each of the seed disks having a different configuration of holes through which the vacuum is drawn to move seeds from the input to the seed tube.

The manual for the 7200 Max Emerge, 16 row, narrow flex-fold planter, for example, describes and depicts thirteen different seed disks. According to the manual, the seed size for certain grains, such as corn seed, vary widely. The manual recommends disk H136478 for the smallest sized corn seed, recommends disk A43215 for medium sized corn seed, and recommends disk A50617 for large sized corn seed.

The proper operation of the John Deere planter, therefore, requires the selection of the appropriate seed disk for use with the size and type of seed to be planted. To compensate for differences in weight, size, and shape of the various seeds, the proper operation of the planter also requires adjustments to the vacuum drawn to one side of the seed disk and depending on the size of seed being planted, the installation or removal of certain optional features. It is also recommended that the machine be monitored during its use and that the strength of the vacuum be adjusted if the machine is found to be under planting or over planting seed.

The machine scratches a trough in the ground and when the machine is operating properly it will deposit one seed every six inches along the trough or one hundred seeds along a six hundred inch length of ground. When the one hundred seeds are all equally spaced from one another, the stalks of corn, or other produce that grows from the seed, will not interfere with each other and the harvest from a tract of land will be maximized. When the machine drops two seeds at once through the seed tube the stalks that grow from the two seeds compete for the same nutrients from the ground and the same light from the sun resulting in both stalks being stunted and a reduced harvest from the tract of land. Similarly, when the machine fails altogether to drop a seed at one of the planting locations, the harvest is also reduced. A machine is considered to be operating at one hundred percent efficiency if it will plant one hundred seeds in one hundred equally spaced planting locations along a length of ground. Where the machine plants ninety-eight seeds in one hundred locations, it is considered to be operating at ninety-eight percent efficiency and where it is planting one hundred and two seeds in every one hundred locations (a second seed into each of two locations), the machine is considered to be operating at one hundred and two percent efficiency. A farmer will consider a machine that is operating outside the range of ninety-five percent to one hundred and five percent to be unacceptably inefficient and in either case will be required to adjust the vacuum or replace the seed disks of the machine to improve its efficiency. The desired operating range for such machines is between ninety-nine percent and one hundred and one percent efficiency. The planters manufactured by John Deere are adapted to plant from four to thirty-one rows simultaneously with a metering unit including a hopper retaining seed and a seed disk for each row to be planted by the machine.

The difficulties of maintaining proper efficiency are accentuated in the case of corn seed, which is one of the major grains for which the John Deere planter is employed. Although it would be desirable for a farmer to obtain seed which is of all the same size, as a practical matter, he must deal with seeds of varying size. As previously stated, John Deere offers three different seed disks for use in planting corn seed, one disk for each of three ranges of seed size.

In my patent application filed Mar. 28, 2002, now U.S. Pat. No. 6,932,236 B2, I disclosed a kit that includes an improved seed disk for insertion into the metering unit of a John Deere planter to improve the efficiency with which seed, especially corn seed, is planted. Specifically, machines having metering units fitted with the parts described in my patent no. 6,932,236 B1 will reliably deposit between ninety-nine and one hundred and one corn seeds along a length of ground that should receive one hundred seeds.

Another factor that effects the harvest produced by a tract of land is the spacing between the seeds along a row. Even though a row of seeds may have the correct number of seeds spaced along its length, if the seeds are not equally spaced apart from each other, the seeds that are spaced too close together will experience the problems of crowding and seeds that are spaced too far apart will not flourish enough to compensate for the stalks that are crowded.

Farmers have long recognized that John Deere planters have difficulty maintaining the spacing between seeds needed to maximize the harvest for a tract of land. The recognized solution to improve spacing is to operate the planter at a slower rate of speed. Although John Deere recommends that its planter be pulled at five miles per hour, farmers who want to avoid having a harvest that is reduced by poor seed spacing will choose to pull their planters at four miles per hour. Reducing the speed at which the planter is pulled increases the time required for planting and farmers who plant large acreage often encounter weather conditions and the like that allow a short planning season. In such cases, the farmer may be forced to pull the planter at six miles per hour, causing the spacings of the seeds to be even more uneven than when pulled at five miles per hour.

Even planters having metering units fitted with parts in accordance with my U.S. Pat. No. 6,932,236 B1 experience uneven spacing between seeds. This problem has been partially dealt with in my co-pending application Ser. No.

10/803,265 filed Mar. 18, 2004, but that has not resulted in a total solution the problem. It would be desirable; therefore, to provide an improvement to a vacuum seed planter that would improve the spacings between seeds planted without requiring that the machine be pulled at a slower rate of speed.

SUMMARY OF THE INVENTION

Briefly, the present invention is embodied in a method and apparatus for improving the spacing of seeds planted by a seed planter of the type manufactured by John Deere, having a metering unit for retaining a circular rotatable seed disk wherein seed is introduced into a first cavity in the metering unit defined by a first surface of the seed disk and a vacuum in drawn in a second cavity defined by the second surface of the seed disk. The vacuum draws individual seeds against transverse holes in the seed disk and releases the seeds to drop through a seed chute in the bottom of the metering unit and into the upper end of a seed tube that directs the seed into the ground for planting.

The seed chute is a channel having a generally rectangular opening with two approximately four inch long sides that are generally parallel to the seed disk and shorter, two inch long leading and trailing ends perpendicular to the long sides. The seed tube is an elongate tubular member having a generally rectangular cross-section which flares outward at the upper end thereof. The upper end of the seed tube is rectangular in shape with long sides that are a little longer than the outer dimensions of the long sides of the seed chute and short sides that are a little longer than the short sides of the seed chute.

During operation, seeds are drawn by the vacuum against the holes at the outer circumference of the rotating seed disk where they are retained as the disk moves through an arc that carries the seeds to a position above the seed chute and the seed tube. As the seeds reach a position above the seed chute, the disk moves away from the vacuum and the seeds fall away from the disk and through the rectangular opening of the seed chute and into the upper end of the seed tube. I have observed that all of the seeds that fall away from a given seed disk follow the same arc or path as they drop away from the seed disk and fall through the opening of the seed chute and into the seed tube below. Since each seed disk is intended for a different size and type of seed, each seed disk has a different thickness and surface configuration and therefore the path of the seeds falling away from one seed disk may be greatly different from the path of seeds falling away from another seed disk, but seeds falling away from a single seed disk all follow substantially the same path. Where the vacuum holes of the seed disk are positioned around the perimeter of the seed disk, as are the vacuum holes for all seed disks intended for use with corn, including a disk in accordance with my U.S. Pat. No. 6,932,236 B2, the seeds will be released very near to the leading wall of the seed tube where the leading wall is the narrow wall that is in the direction of motion of the planter as it moves across the field.

Where the path of seeds falling away from the seed disk carries the seeds along one wall of the seed tube, the moving seeds encounter the surface of the seed tube and some of the seeds are deflected by the irregularities in the inner surface of the seed tube. As the seeds become deflected by contact with the surfaces of the seed tube, they begin to ricochet or bounce down the remaining portion of the seed tube until they reach the lower end thereof and fall into the trough in the ground cut by the planter after which they are covered up and allowed to grow. Although the seeds falling away from a seed disk follow the same path as they move through the air, each seed follows a different path once it makes contact with the surface of the seed tube. Whereas one seed may slide along the surface and move smoothly down the length of the tube until it is expelled, a second seed following the first seed may be deflected from one surface to another of the seed chute and ricochet down its length causing it to be emitted into the trough after a longer period of time than the first seed. If the third seed slides through the seed tube without being deflected as severely as the second seed, it will be expelled into the trough as rapidly as the first seed and follow shortly behind the second seed such that the second seed is planted near the third seed and spaced a longer distance away from the first seed resulting in the uneven spacing of the seeds. To minimize the deflection of the seeds within the seed tube, it is desirable that the seeds follow a path that carries them near a vertical centerline of the seed tube such that the free fall of the seeds is maximized. It is desirable that the falling seeds do not contact the leading end or either of the side walls of the seed tube until the seed has dropped as far as possible down the length of the seed tube. It should be noted that the seed tube, as manufactured by John Deere, is somewhat tapered at the upper end thereof such that the walls are angled rather than vertical and seeds that engage the angled walls of the upper portion of the seed tube will be more highly deflected than seeds that fall between the sloping walls of the upper portions of the seed tube and do not engage the walls of the seed tube until the midportion thereof is reached where the side walls are vertical.

To direct the path of seeds falling from the seed disk so as to carry them near the center line of the seed tube, a deflector in accordance with the present invention is positioned on the outer wall of the first cavity of the metering unit immediately following the position at which the seed disk moves away from the vacuum. The deflector is configured so as to urge the path of seeds falling away from the seed disk away from the leading wall of the seed tube, and toward a centerline between the side walls of the seed tube to thereby maximize the free fall of the seeds before engaging a surface of the seed tube.

BRIEF DESCRIPTION OF THE DRAWINGS

A better and more complete understanding of the invention will be had after a reading of the following detailed description taken in conjunction with the drawings wherein:

FIG. 10 is a front elevational view of one side of the metering unit shown in FIG. 6 with a portion of the seed disk broken away.

DETAILED DESCRIPTION OF A PREFERRED EMBODIMENT

Figure 1:
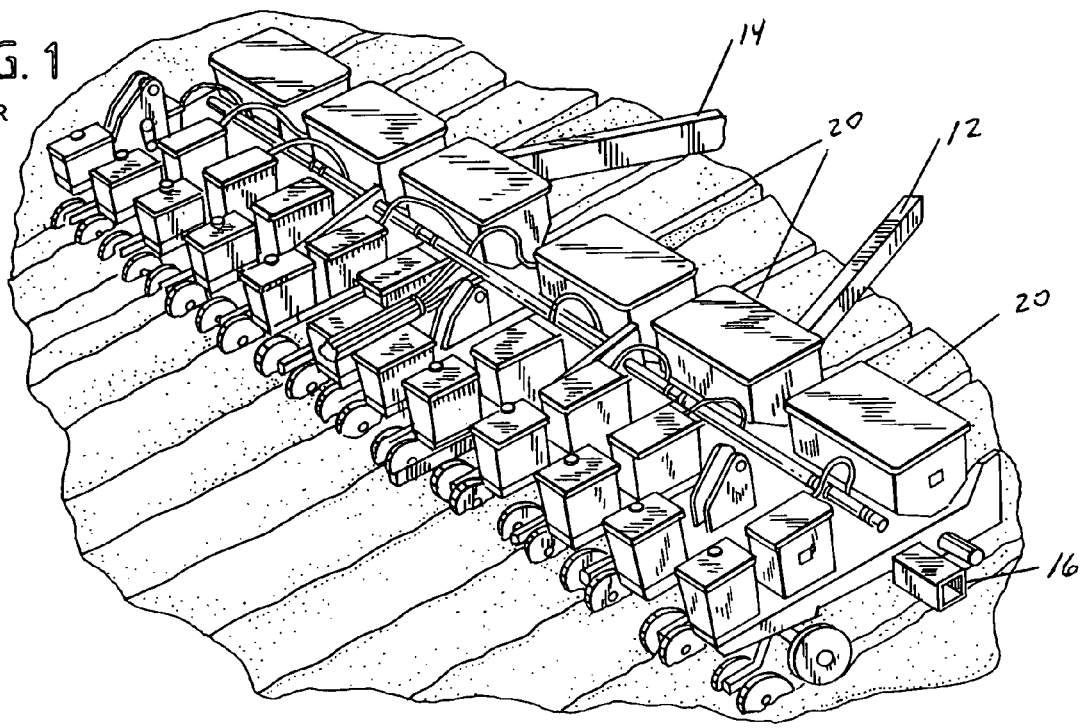
FIG. 1 is a an isometric view of a John Deere planter.

Referring to FIG. 1, a John Deere planter such as a 7200 Max Emerge Flex-fold planter 10 includes a pair of elongate tow bars 12, 14 at the rearward end of which is a cross bar 16 having wheels, not shown, for transporting the planter 10 across the open highway. Extending along the length of the cross bar 14 are a plurality of row units 30-30. John Deere manufactures planters 10 which vary in width from four to thirty one row units.

The model 7200 planter was first offered for sale in 1987 and since then John Deere has placed several other models on the market including models 1750, 1760, 1770, and 1780, each of which has corresponding parts and the performances of all of which are improved by the use of the present invention.

Figure 2:
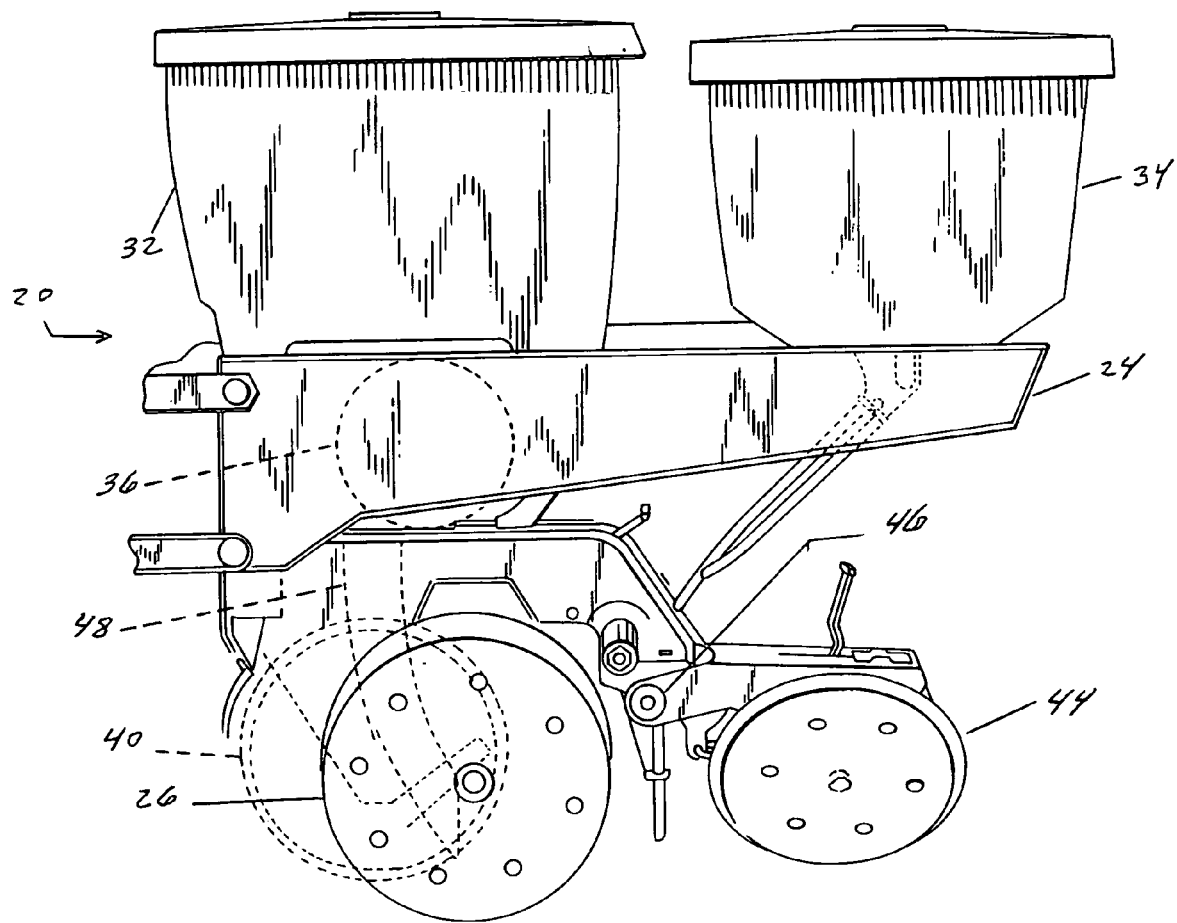
FIG. 2 is a side elevational view of a row unit of the planter shown in FIG. 1 with the metering unit therein shown in broken lines.
Figure 3:
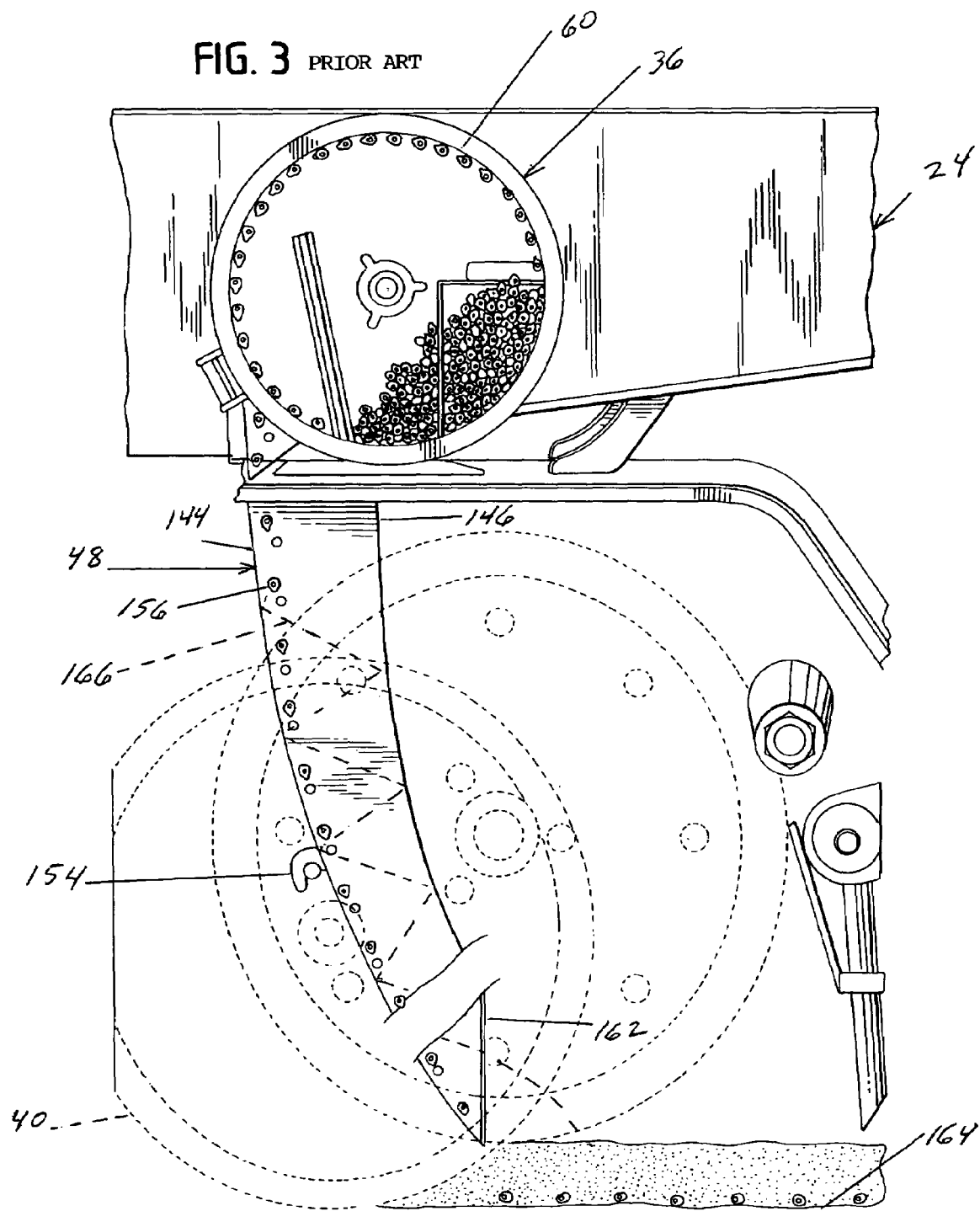
FIG. 3 is an enlarged fragmentary side elevational view of the row unit shown in FIG. 2 with the metering unit visible within, the metering unit being without a deflecting member in accordance with the invention.

Referring to FIGS. 2 and 3, each row unit 20 has a frame 24 supported by a pair of spaced apart wheels, one of which 26 is visible in FIG. 2. Mounted above the frame 24 are a first hopper 32 for retaining seed and a second hopper 34 for retaining a dry herbicide. Below the seed hopper 32 is a metering unit 36 and a chute, not shown, directs seed from the hopper 32 to the metering unit 36. Below the metering unit 36 are opener discs 40. Rearward of the opener discs 40 are closing wheels 44, the elevation of which is adjustable through a pivot 46 to thereby permit the opener discs 44 to create a trench of the depth desired for the seed being planted.

A seed tube 48 extends from the metering unit 36 to a position between the opener discs 40 for directing individual seeds singulated by the metering unit 36 into the furrow of ground formed by the opener discs 40, thereby planting the seed. A gearing assembly, not shown, connected to the wheels 26 rotates a drive member, also not show, which rotates a shaft 42 that extends through the metering unit and drives the metering unit 36 such that the rate at which the metering unit discharges seed is coordinated to the ground speed of the planter 10.

When the planer 10 operates properly, the planted seed will have a predetermined spacing, such as six inches, between adjacent seeds. If the spacing between adjacent seeds is too close, the plants that grow from the seed will interfere with each other and thereby reduce the yield of the field. If the spacing between seeds is too far apart, the yield from the field will also be reduced and therefore, yield is maximized when the seed is consistently planted with the desired spacing between seed.

Referring to FIGS. 6 through 10, the metering unit 36 includes a first housing member 50, having a generally cylindrical outer wall 52 and a planar rear wall 54 thereby forming a cavity. Extending from the rear wall 54, axially with respect to the cylindrical outer wall 52, is a tubular retaining hub 56 at the distal end of which is a handle 58 which is rotatable between a first position for receiving or removing a seed disk 60 and a second position for removably retaining a seed disk 60 on the hub 56.

Figure 6:
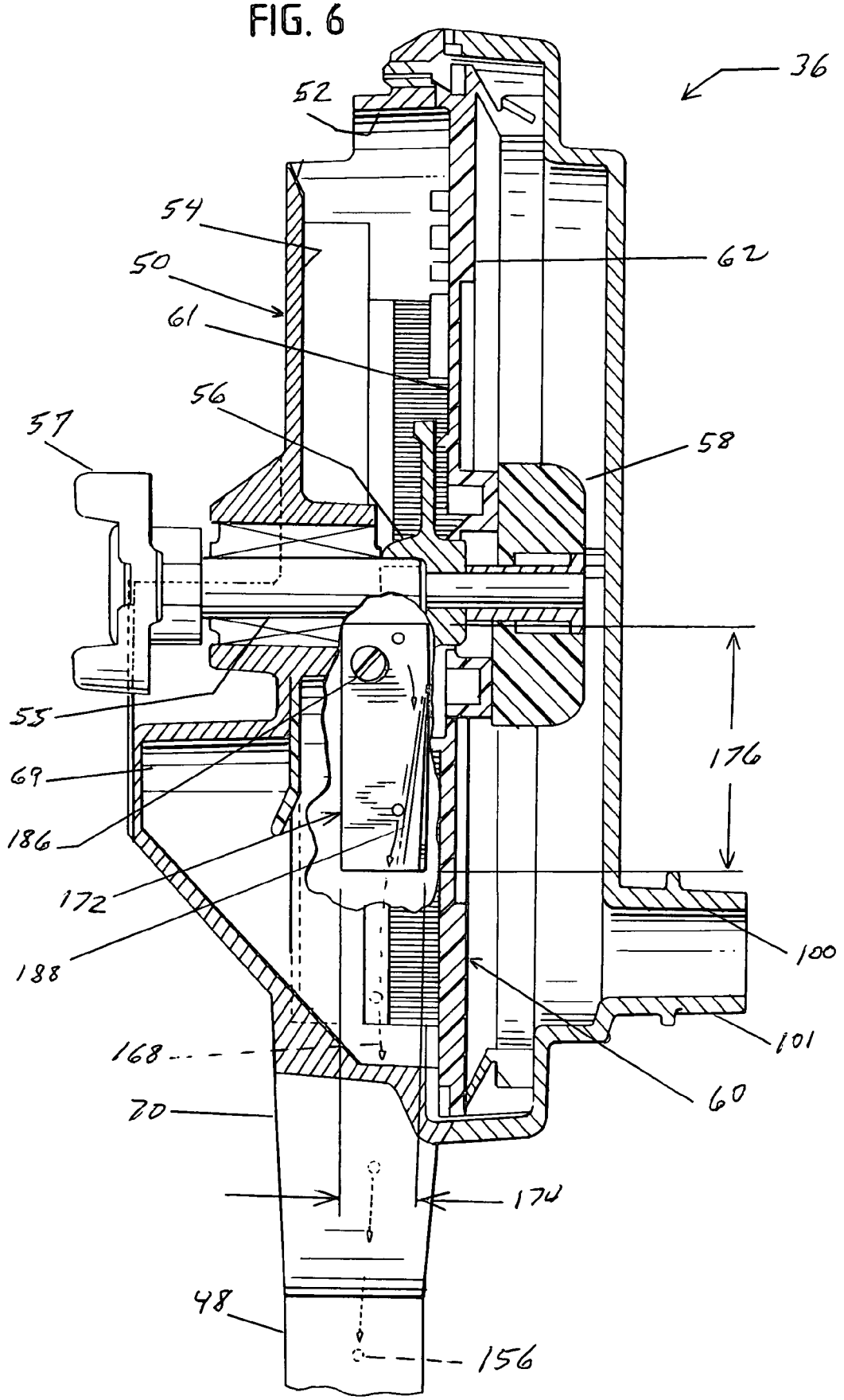
FIG. 6 is a cross-sectional view of a metering unit such as shown in FIG. 2 but fitted with a deflector in accordance with the present invention.
Figure 7:
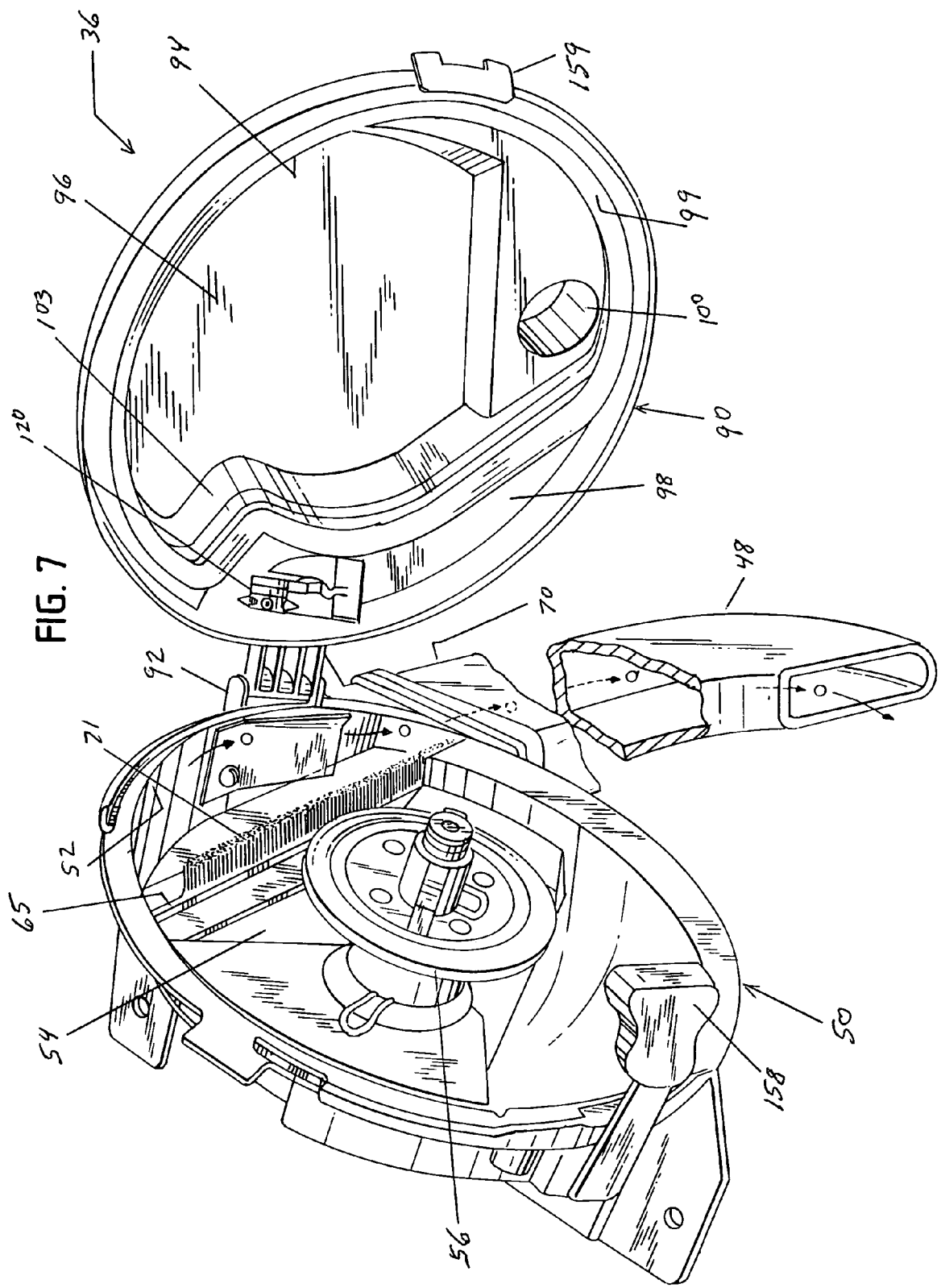
FIG. 7 is an isometric view of the metering unit shown in FIG. 6 with the metering unit open and the seed disk removed.
Figure 8:
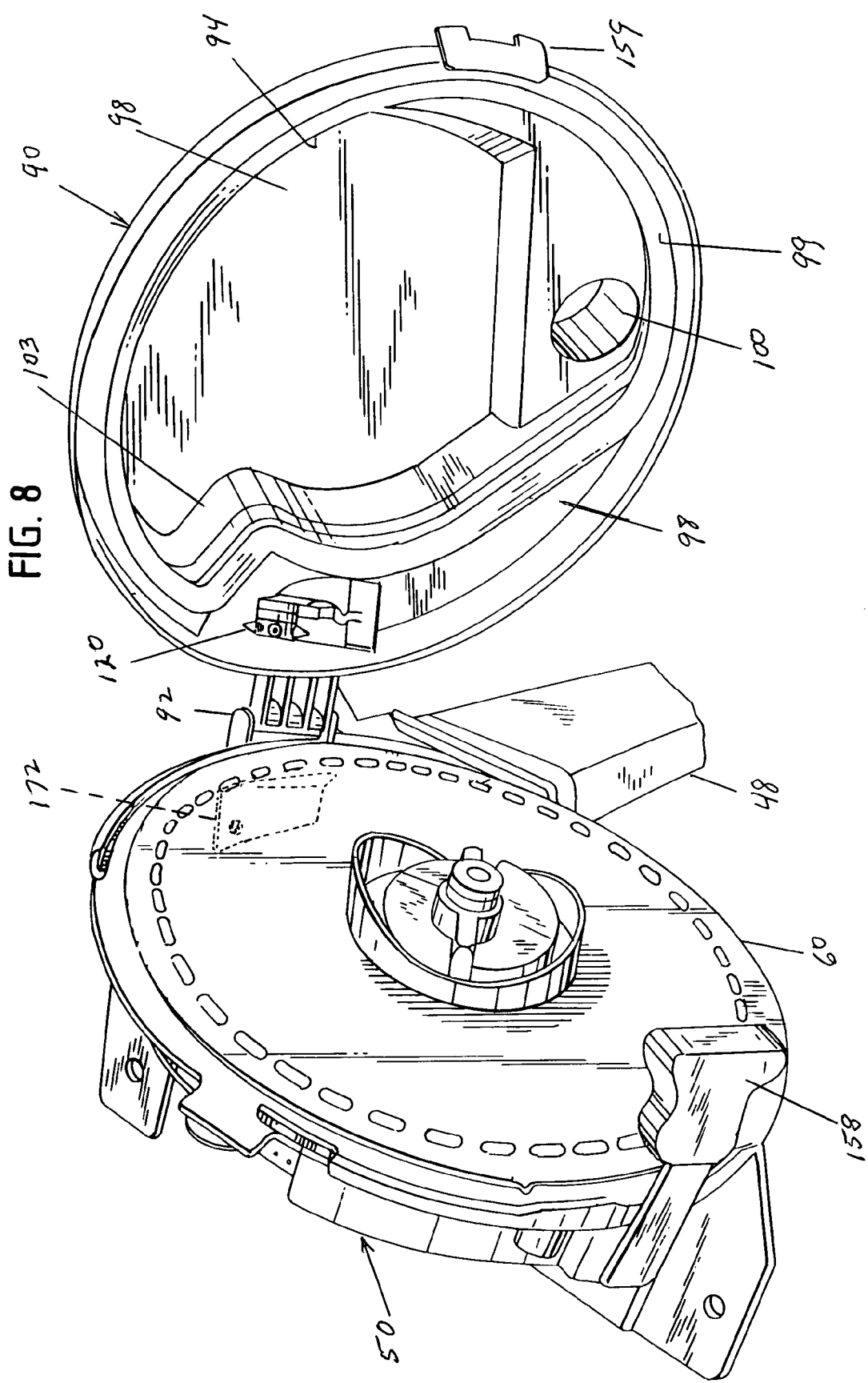
FIG. 8 is an isometric view of the metering unit in the open condition with the seed disk inserted.

Referring to FIGS. 6, 7, and 8, the retaining hub 56 is threaded on a cylindrical drive shaft 55 at the distal end of which are a pair of flanges 57 for drivingly engaging a drive member, not shown, which in turn is drivingly connected by the gearing, also not shown, to the wheels 26. A removable spring locking pin, not shown, locks the tubular retaining hub 56 to the inner drive shaft 55. By removing the spring locking pin, the retaining hub 56 can be rotated with respect to the inner shaft to thereby axially move the retaining hub 56 with respect to the rear wall 54 of the first housing member 50. Rotating the retaining hub 56 clockwise with respect to the drive shaft moves a seed disk 60 retained thereon toward the rear wall 54 and rotating the retaining hub 56 counterclockwise moves a seed disk 60 thereon away from the rear wall 54 of the first housing member 50. Adjusting the retaining hub 56 causes the axial adjustment of the seed disk 60, after which the parts are locked into their desired orientation by locking pin 59.

Figure 4:
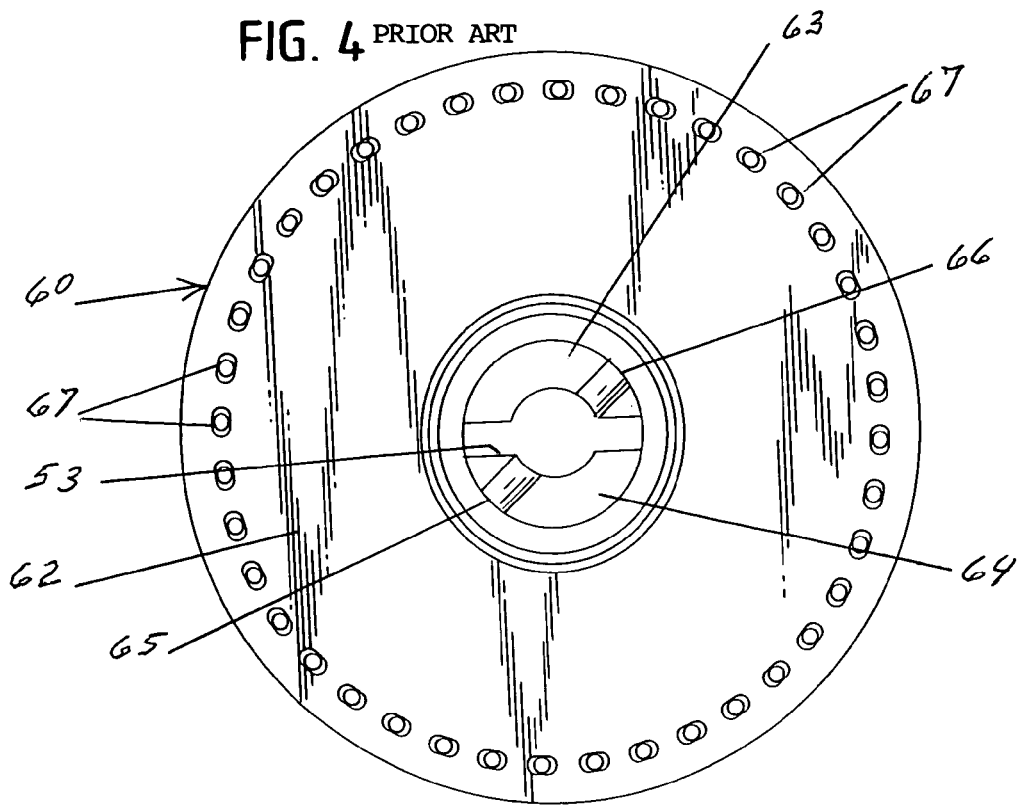
FIG. 4 is a front elevational view of a seed disk for use in the metering unit shown in FIG. 2.
Figure 5:
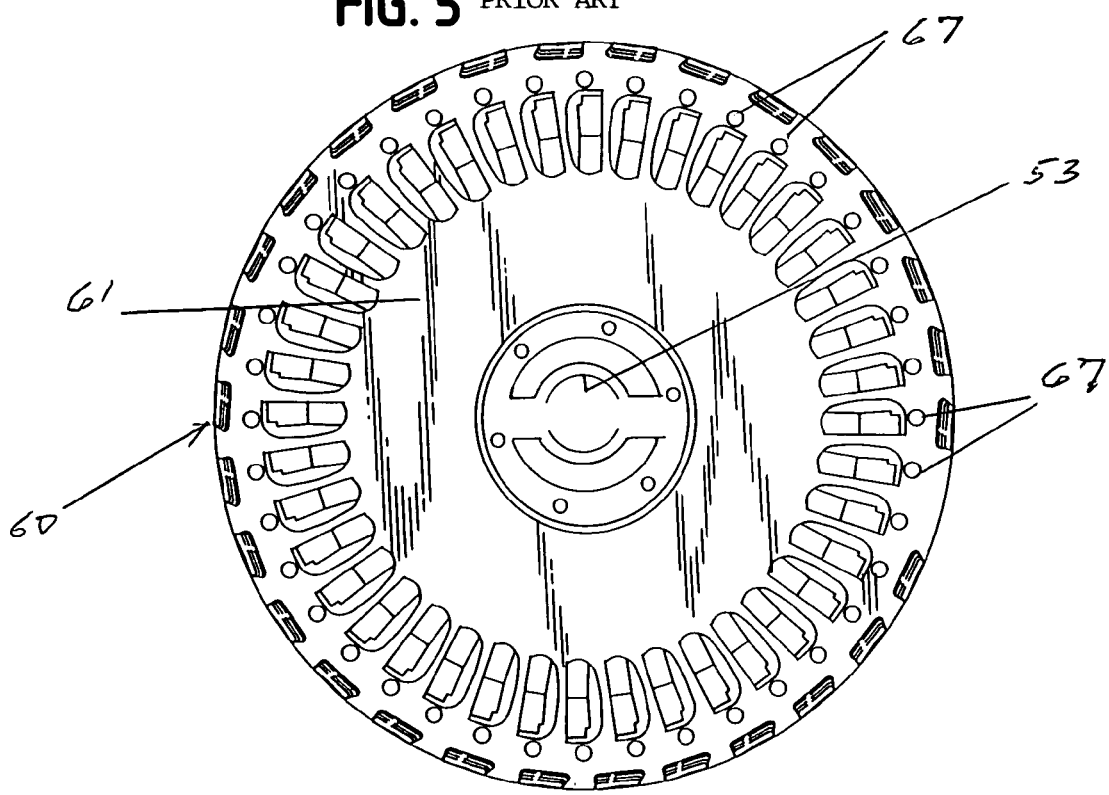
FIG. 5 is a rear elevational view of the seed disk shown in FIG. 4.

Referring briefly to FIGS. 4 and 5, the seed disk 60 has a generally circular body with first and second planar surfaces 61, 62, and having a wing shaped central opening 53. The opening 53 is shaped to receive the winged hub handle 58, not shown, at the distal end of the retaining hub 56 of first housing member 50. Surrounding the central opening 53 on the second side 62 are two arcuately shaped opposing ramped surfaces 63, 64 and opposing locking notches 65,66 for locking the seed disk 60 to the hub 56. Extending around a circle which is spaced a short distance within the outer circumference of the seed disk 60 are a plurality of spaced transverse holes 67-67. The diameter of the cylindrical outer end of the seed disc 60 is a little less than the inner diameter of the tubular outer wall 52 of the first housing member 50 of the metering unit 36 (and of the cylindrical outer wall of the second housing member 90, as is further described below).

Referring further to FIGS. 3 and 6, the first housing 50 includes an upwardly opening access port 69 in the rear wall 52 into which the lower end of the chute from the hopper 32 extends, allowing seeds to enter the first housing member 50. Approximately diametrically opposite the access port 69 is a seed chute 70 in the cylindrical wall 52 of the housing member 50 through which singulated seeds drop and fall into the seed tube 48 for planting. When assembled on a row unit 30, the metering unit 36 is oriented with the axis of the hub 56 horizontal and the seed chute 70 extending downward as is shown in FIG. 3.

Referring to FIGS. 11 and 12, the seed chute 70 is a short, tubular member with a generally rectangular cross-section having parallel long sides 122, 124 and parallel short sides 126, 128. The short sides 126, 128 and long side 122 are formed as part of the casting for first housing member 50 and create a channel. Long side 124, extends generally parallel to long side 122 and is formed by a plastic member 129 that extends across the ends of short sides 126, 128 and is held in place by hooks 132, 133 that are received in holes 134, 135 in the ends of short side 128 and by a removable snap 136 that attaches to a catch 138 on the short side 126.

Referring to FIGS. 3, 11 and 12, the seed tube 48 is an elongate, tapered, tubular member having a rectangular cross-section consisting of first and second opposing side walls 140, 142 and generally perpendicular thereto, leading and trailing walls 144, 146. The seed tube 48 is molded of plastic and has formed into the body thereof and has a plurality of mounting points along the length thereof, now shown, except for hook 154 shown on FIG. 3, for the attachment of the seed tube 48 to the row unit 30.

Referring to FIG. 7, extending across the rear surface of the first housing member 50 and adjacent the hub 56 is an elongate brush 71 having one end connected to the outer wall 52 and the second end spaced a short distance from the cylindrical outer wall 52 leaving a gap 65 between the distal end of the brush 71 and the inner surface of the cylindrical outer wall 52. The brush 71 is positioned to separate seed entering the access port 69 from inadvertently reaching the seed chute 70. The bristles of the brush 71 extend axially away from the rear wall 52 and brush against the first surface 61 of a seed disk 60 which has been retained thereto by the retaining hub 56 thereby creating a partial barrier between the outer wall 52 and the seed disk 60. The brush 71 insures that seeds singulated by the seed disk 60 are removed therefrom as the disk passes over the seed chute 70 in the wall 52 and further separates the loose seeds entering through the port 69 from inadvertently entering the seed chute 70 and falling into the seed tube 48.

Referring further to FIGS. 6, 7, and 8, the metering unit 36 includes a second housing member 90 attached by a pivot pin 92 to the first housing member 50. The second housing member 90 has a generally tubular outer wall 94 and a planar rear surface 96 such that it too has a cavity therein. The tubular outer wall 96 includes an intrusions portion 98 including a generally radial wall 103, and around the inner edge of the outer wall 94 and the intrusion portion 98 is a rubberized sealing member 99 which seals against the second surface 62 of a seed disk 60 when the housing members 50, 90 are assembled against each other as further described below.

The second housing member 90 further has an aperture 100 in the rear wall 96 and the outer surface of the second housing member has a tubular protrusion 101 the inner opening of which communicates with the aperture 100 and is adapted to receive a vacuum hose, not shown, leading from a vacuum pump. Most John Deere planters 10 have one or two vacuum pumps, not shown.

Within the intrusion portion 98 of the second housing member 90 is a third cavity defined by a portion of the cylindrical outer wall 94 and the wall of the intrusion portion 98, and mounted thereon is a knockout assembly 120 of the type manufactured by John Deere.

Referring to FIGS. 7 and 8, a latch assembly 158 on the first housing member 50 is adapted to engage a second latch member 159 on the second housing member 90 for retaining the two housing members 50, 90 engaged with one another, to thereby form the assembled metering unit 36.

As shown in FIGS. 3, 5, and 7, when the two housing members 50, 90 are latched in assembled relationship, with a seed disk 60 retained on the retaining hub 56 of the housing member 50, the interior of the metering unit 36 will be divided into two chambers. The first chamber is defined by the cavity in the first housing member 50 and the first surface 61 of the seed disk 60. The second chamber is defined by the cavity in the second housing member 90 and the second surface 62 of the seed disk 60. It should be appreciated that the second chamber excludes the intrusion portion 98 of the second housing member 90.

A vacuum is drawn by the vacuum pumps through lines connected to the second housing member 90 and through the aperture 100 creating a vacuum in the second chamber of the metering unit 36. Meanwhile, seeds 156 from within the seed hopper 32 drops through the chute 38 and through the port 69 into the first chamber. When the metering unit 36 is operating properly, the vacuum in the second chamber is drawn through the plurality of holes 67-67 of the seed disk 60 except for those holes 67-67 positioned beyond the sealing member 99 (defined by the intrusion portion 98). The intrusion portion 98 sections off from the cavity of the second housing member 90 the portion of the seed disk 60 for which a vacuum is not drawn through the vacuum holes 67-67. As the disk 60 rotates through the mass of seeds 156 which accumulate near the port 69, one seed is drawn by the vacuum against each of the transverse holes 67-67. As the seed disk 60 continues to rotate within the metering unit 36, the singulated seeds are moved through the gap 65 at the distal end of the brush 71 and over the seed chute 70 in the outer wall 52 of the second housing member 50. As each of the singulated seeds is moved over the seed chute 70, the aperture of the associated hole 67 on the second side 62 of the seed disk 60 crosses the vacuum barrier formed by the sealing member 99 across the radial wall 103 thereby releasing the seed from the first side 61. The seeds then fall away from the seed disk 60 and fall in an arc or path through the seed chute 70 in the outer wall 52 of the first housing member 50 and through the seed tube 48 to be planted.

Each seed disk 60 has a different thickness and configuration and is intended for a different size and shape of seed 156. As a result, the seeds 156 that fall away from a first seed disk 60 fall through a different path than those that fall away from a second seed disk 60 used for a different type or different size of seed. However, all the seeds 156 that fall off a given seed disk 60 follow substantially the same path as they fall away from the seed disk 60.

For example, the seed disks sold by John Deere, not shown, for planting corn in the planer 10 have contoured pockets with raised outer boundaries that surround the openings for the vacuum holes on the first side thereof. The pockets and raised boundaries are intended to assist in singulating the seed and they also cause the seeds to fall nearly midway between the side walls 140, 142. On the other hand, the seed disk disclosed in my U.S. Pat. No. 6,932,236 B2 has a flat first surface against which the seeds are held as they are moved over the seed chute 70. The absence of raised boundaries around the vacuum holes 67 causes the seed 156 dropped from the seed disk disclosed in my U.S. Pat. No. 6,932,236 B2 to drop through the seed chute 70 nearer to the second housing 90 and nearer to side wall 142 than do seeds dropped by the disks sold by John Deere for planting corn seed.

For example, the seed disks sold by John Deere, not shown, for planting corn in the planer 10 have contoured pockets with raised outer boundaries that surround the openings for the vacuum holes on the first side thereof. The pockets and raised boundaries are intended to assist in singulating the seed and they also cause the seeds to fall nearly midway between the seeds walls 140, 142. On the other hand, the seed disk disclosed in my U.S. Pat. No. 6,932,236 B2 has a flat first surface against which the seeds are held as they are moved over the seed chute 70. The absence of raised boundaries around the vacuum holes 67 causes the seed 156 dropped from the seed disk disclosed in my U.S. Pat. No. 6,932,236 B2 to drop through the seed chute 70 nearer to the second housing 90 and nearer to side wall 142 than do seeds dropped by the disks sold by John Deere for planting corn seed.

Referring to FIG. 3, the seed tube 48 is positioned with the leading wall 144 directly below the most forward position of the seed disk 60. The manufacturers of the product intended that the seeds 156 released by the seed disk 60 would slide along the slightly curved leading wall 144 until they fall out of the distal end 162 thereof and into the trough 164 in the ground for planting. In reality, not all of the seeds 156 slide along the curved leading wall 144 as intended, but some are deflected and follow irregular paths, such as path 166 and encounter several of the inner surfaces of the seed tube 48 as it they are ricocheted along the tube 48 before being expelled out the discharge opening 162 for planting. For all the seed disks manufactured by John Deere, the seeds are released near the outer wall 52 of the metering unit 36 and follow a path that takes them along the leading wall 144 from the point of entry into the seed tube 48 such that many are deflected as they move downward through the length of the seed tube 48.

Furthermore, depending on the configuration and thickness of the seed disk 60 in the metering unit 36, the seeds falling from the seed disk 60 may follow a downward path that does not take it midway between the side walls 140, 142, but rather in a path that is near side wall 142 such that the seeds 156 engage the side wall 142 where it is partially sloped causing some of the seeds to be deflected and thereafter ricochet down the remaining portions of the length of the seed tube 48.

Referring to FIGS. 6, 7, 8, 9, and 10, it is desirable to direct the path 168 of seeds 156 so that they fall as nearly as possible to a center line 170 of the seed tube 48 that is equally spaced between the side walls 140, 142 of the seed tube 48 and spaced from the leading wall 144 so that the seeds 156 will drop as far as possible down the length of the seed tube 48 before encountering one of the side walls 140, 142 or the lead wall 144. To direct the path 168 of the seed 156 toward the center line 170, a deflector 172 is mounted on the cylindrical inner wall 52 of the first housing member 50 at a position immediately opposite the radial wall 103 that defines the position at which seeds are released from the seed disk 60 and allowed to fall. The deflector 172 is preferably made of a stainless spring steel plate so as to not be subject to corrosion and so as to retain its shape while being subjected to pressure applied by the seeds as they move along its surface. Preferably, the deflector 172 is rectangular in shape with a width 174 of approximately three-quarters inch and a length 176 of between one and one-half and two inches. The deflector 172 preferably also has a first very gentle bend 178 separating a mounting section 180 from a deflection section 182 and a transverse hole, not visible, in the mounting section 180 such that a mounting screw 186 can be extended through the hole in the mounting portion and into a threaded hole, 187, in the cylindrical inner wall 52 of the first housing 50 for retaining the deflector 172. The deflector 172 has a second bend in the form of a clearly definable crease 188 that extends at an angle that more closely parallels the length 176 than the width 174 of the deflector 172. The deflector 172 is attached to the inner wall 52 of the first housing 50 with the end of the crease 188 nearest the mounting section 180 positioned at the point where the seeds 156 are released from the seed disk 60. Since the seeds 156 are released by the seed disk very near the outer wall 54, soon after they are released, they will contact the surface of the deflector 182. Once released from the seed disk 60, the seeds 156 will be directed by the surfaces of the deflector along the crease 188 and the deflector 172 will cause the path 168 of the seeds to be directed towards a centerline 170 generally midway between the side walls 140, 142 of the seed tube 48.

Figure 9:
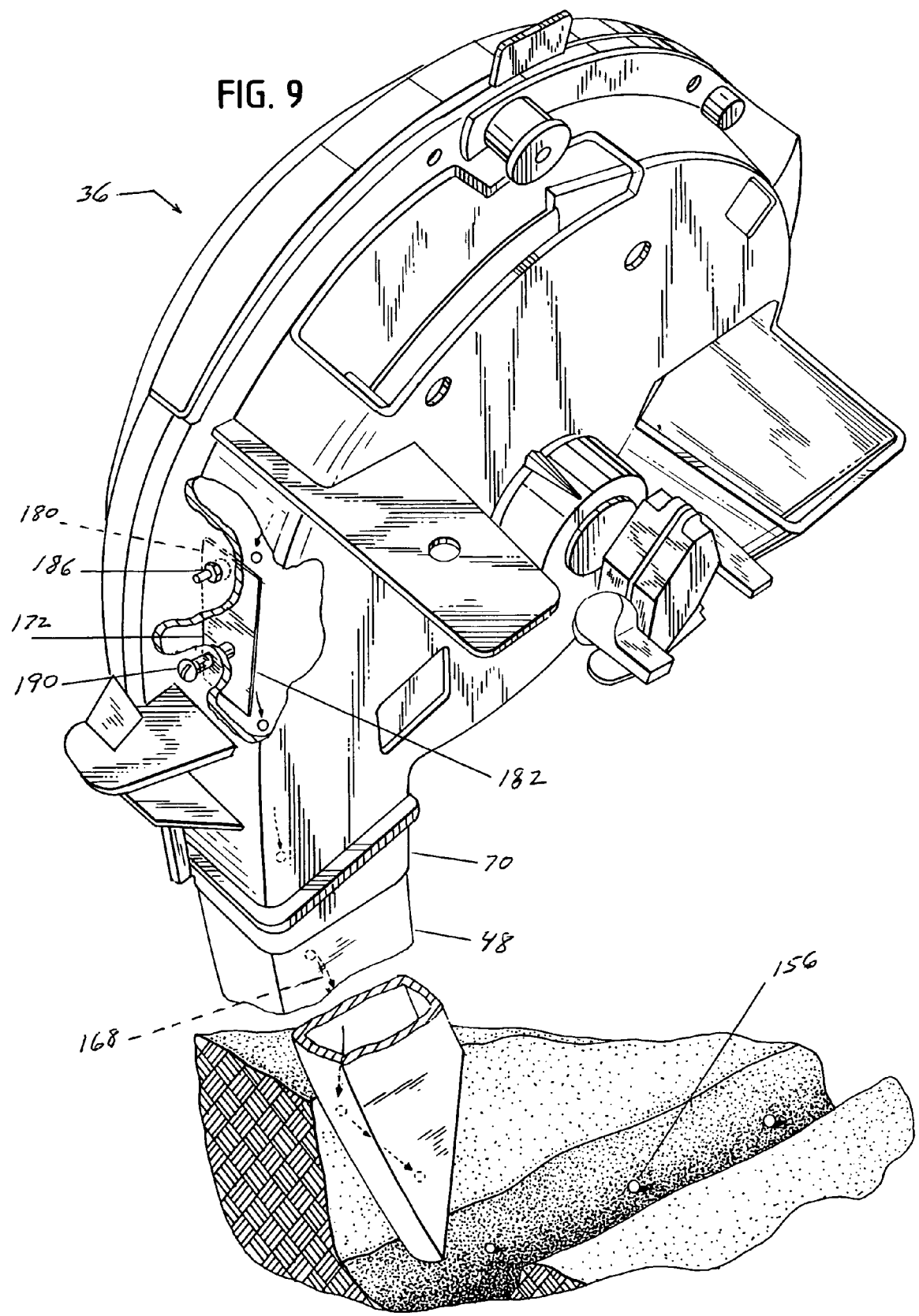
FIG. 9 is an isometric view of the metering unit shown in FIG. 6 with the unit closed and a portion of the wall broken away so the deflector is visible.

Referring to FIG. 9, a threaded adjustment screw 190 is threaded into a tapped hole in the cylindrical wall 52 of the first housing member 50 until the distal end of the screw 190 contacts the rear surface of the deflection section 182 of the deflector 172. Further tightening of the screw 190 causes the distal end of the deflection section 182 to move further outward of the cylindrical wall 52 thereby deflecting the path 168 of the seeds 156 further from the leading wall 144 of the seed tube 48. By adjusting the screw 190, the path 168 of the falling seeds 156 can be set so they do not follow the curve of the leading wall 144 of the seed tube 48 but free fall through down half the length of the seed tube 48 or more before first contacting a portion of the leading wall 144. Since the path 168 of falling seeds results in the seeds not encountering the walls of the seed tube 48 until the seeds have dropped approximately half the length of the seed tube 48, the seeds that are planted are more nearly equally spaced apart as they are emitted through the aperture 162 at the lower end of the seed tube 48. As a consequence of the seeds being equally spaced apart as they are emitted through the aperture 162, the seeds planted by the planter 10 are very nearly equally spaced apart so as to minimize any reduction in harvest caused by the unequal spacing of seeds.

While the present invention has been described with respect to a single embodiment, it will be appreciated that many modifications and variations may be made without departing from the true spirit and scope of the invention. It is, therefore, the intent of the following claims to cover all such modifications and variations which fall within the true spirit and scope of the invention.

What is claimed:

1. In a seed planter having a metering unit having a housing retaining a circular rotatable seed disk, said seed disk having a center, a first surface, a second opposing surface, and a plurality of transverse spaced vacuum holes extending from said first surface to said second surface, wherein seeds are introduced into a first cavity in said housing defined by said first surface and a vacuum is drawn into a second cavity in said housing defined by an inner wall of said housing and by said second surface, such that seeds are retained against said vacuum holes until they are released from said vacuum and dropped through a seed chute and into a seed tube, said seeds follow a predetermined path as they fall away from said seed disk and into said seed tube, the improvement comprising
   said seed tube having generally parallel side walls, a leading wall and a trailing wall,
   said side walls spaced apart from each other by a distance significantly greater than a diameter of one of said seeds,
   said leading wall and said trailing wall spaced from each other by a distance significantly greater than said diameter of one of said seeds,
   a deflector on said inner wall, said deflector deflecting said path toward a vertical centerline between said leading and trailing walls wherein said seeds will free fall between said leading and trailing walls for a portion of a length of said seed tube.

2. The improvement of claim 1 and wherein said deflector further deflects said path toward a vertical centerline between said opposing side walls.

3. The improvement of claim 1 wherein said deflector comprises
   a metal body,
   said body having a mounting portion for attaching said body to said housing, and
   a deflecting portion,
   said deflecting portion has a surface angled with respect to a surface of said mounting portion wherein said deflecting portion deflects said predetermined path toward said centerline between said leading and trailing walls.

4. The improvement of claim 3 and further comprising a crease in said deflecting portion wherein said crease also deflects said predetermined path toward a centerline between said opposing side walls.

5. The improvement of claim 3 wherein said deflector is made of stainless steel.

6. The improvement of claim 3 wherein said deflector is made of spring steel.

7. The improvement of claim 3 and further comprising an adjustment screw for changing an angle of said deflecting portion to thereby adjust said path towards said centerline.

8. In a seed planter having a metering unit having a housing retaining a circular rotatable seed disk, said seed disk having a center, a first surface, a second opposing surface, and a plurality of transverse spaced vacuum holes extending from said first surface to said second surface, wherein seeds are introduced into a first cavity in said housing defined by said first surface and a vacuum is drawn into a second cavity in said housing defined by an inner wall of said housing and by said second surface, such that seeds are retained against said vacuum holes until they are released from said vacuum and dropped through a seed chute and into a seed tube, said seeds follow a predetermined path as they fall away from said seed disk and into said seed tube, the improvement comprising said seed tube having generally parallel side walls, a leading wall and a trailing wall, said side walls spaced apart from each other by a distance significantly greater than a diameter of one of said seeds, said leading wall and said trailing wall spaced from each other by a distance significantly greater than said diameter of one of said seeds, a deflector on said inner wall, said deflector deflecting said path toward a vertical centerline between said opposing side walls wherein said seeds will free fall between said opposing side walls for a portion of a length of said seed tube.

9. The improvement of claim 8 wherein said deflector comprises a metal body, said body having a mounting portion for attaching said deflector to said housing, and a deflecting portion, said deflecting portion having a surface angled with respect to a surface of said mounting portion wherein said deflecting portion deflects said predetermined path toward said centerline.

10. The improvement of claim 9 and further comprising an adjustment screw of changing an angle of said deflecting portion to thereby adjust said path toward said centerline.

11. A seed planter comprising a metering unit having a housing, a rotating seed disk in said housing, said seed disk having a first surface, a second surface opposite said first surface, a plurality of vacuum holes extending from said first surface to said second surface, said first surface defining a first cavity in said housing and said second surface defining a second cavity therein, a vacuum drawn in said second cavity, a seed chute extending downward from said first cavity wherein seeds released from said first side fall in a path through said seed chute, a seed tube extending downward from said seed chute, said seed tube having generally parallel side walls, a leading wall and a trailing wall, said side walls spaced apart from each other by a distance significantly greater than a diameter of one of said seeds, said side walls spaced apart from each other by a distance significantly greater than a diameter of one of said seeds, said leading wall and said trailing wall spaced from each other by a distance significantly greater than said diameter of one of said seeds, a deflector on an inner wall of said housing, said deflector deflecting said path toward a centerline generally midway between said side walls and midway between said leading wall and said trailing wall wherein said seeds will free fall through a portion of a length of said seed tube.

12. The seed planter of claim 11 wherein said deflector comprises a metal body, said body having a mounting portion for attaching said deflector to said housing, and a deflecting portion, said deflecting portion having a surface angled with respect to a surface of said mounting portion wherein said deflecting portion deflects said predetermined path toward said centerline.

13. The seed planter of claim 12 and further comprising an adjustment screw for changing an angle of said deflecting portion to thereby adjust said path toward said centerline.

* * * * *

UNITED STATES PATENT AND TRADEMARK OFFICE
CERTIFICATE OF CORRECTION

PATENT NO.        : 7,228,807 B1
APPLICATION NO.   : 11/392055
DATED             : June 12, 2007
INVENTOR(S)       : Dale VenHuizen It is certified that error appears in the above-identified patent and that said Letters Patent is hereby corrected as shown below:

Column 6, Line 64 after "plastic end" delete "has formed into the body thereof and"

Column 6, Line 65 after "thereof" delete "now" and substitute --not--

Column 10, Line 5 after "through" delete "down"

Column 12, delete lines 21 to 23 both inclusive

Signed and Sealed this

Eighteenth Day of March, 2008

JON W. DUDAS
*Director of the United States Patent and Trademark Office*